(12) United States Patent
McPheat

(10) Patent No.: US 7,959,190 B2
(45) Date of Patent: Jun. 14, 2011

(54) CUFFED CONNECTION SYSTEM ("BFM FITTING ASSEMBLY")

(75) Inventor: Blair Forres McPheat, Auckland (NZ)

(73) Assignee: BFM Technology Limited, Auckland (NZ)

( * ) Notice: Subject to any disclaimer, the term of this patent is extended or adjusted under 35 U.S.C. 154(b) by 289 days.

(21) Appl. No.: 11/922,143

(22) PCT Filed: May 2, 2007

(86) PCT No.: PCT/NZ2007/000096
§ 371 (c)(1),
(2), (4) Date: Dec. 13, 2007

(87) PCT Pub. No.: WO2007/133094
PCT Pub. Date: Nov. 22, 2007

(65) Prior Publication Data
US 2008/0265570 A1    Oct. 30, 2008

(30) Foreign Application Priority Data

May 12, 2006 (NZ) .................................. 547189
Jun. 27, 2006 (NZ) .................................. 548174
Oct. 26, 2006 (NZ) .................................. 550870

(51) Int. Cl.
*F16L 31/00* (2006.01)
(52) U.S. Cl. ......................... 285/260; 285/330
(58) Field of Classification Search .................. 285/235, 285/237, 236, 304, 330, 334.3, 370, 424, 285/260
See application file for complete search history.

(56) References Cited

U.S. PATENT DOCUMENTS

| | | | | |
|---|---|---|---|---|
| 1,083,002 A * | 12/1913 | Charls | ............ | 285/424 |
| 1,525,538 A * | 2/1925 | Hooper | ............ | 285/260 |
| 1,948,909 A * | 2/1934 | Hooper | ............ | 285/321 |
| 2,003,732 A * | 6/1935 | Bins | ............ | 285/238 |
| 2,386,562 A * | 10/1945 | Mahoney | ............ | 285/330 |
| 2,567,773 A * | 9/1951 | Krupp | ............ | 285/334.3 |
| 3,114,567 A * | 12/1963 | Sidney | ............ | 285/330 |
| 3,376,055 A * | 4/1968 | Donroe | ............ | 285/236 |
| 3,413,021 A * | 11/1968 | Potts | ............ | 285/424 |
| 3,512,805 A * | 5/1970 | Glatz | ............ | 285/424 |
| 3,820,826 A * | 6/1974 | Ligon et al. | ............ | 285/370 |
| 3,873,137 A * | 3/1975 | Yamaguchi | ............ | 285/235 |
| 3,938,834 A * | 2/1976 | Oostenbrink | ............ | 285/235 |
| 3,945,617 A * | 3/1976 | Callery | ............ | 285/235 |
| 4,015,961 A * | 4/1977 | Howard et al. | ............ | 285/260 |
| 4,405,159 A * | 9/1983 | Spelber | ............ | 285/236 |
| 4,548,429 A * | 10/1985 | Merz | ............ | 285/236 |
| 4,625,998 A | 12/1986 | Draudt et al. | | |
| 4,714,279 A | 12/1987 | Custeau | | |
| 4,768,563 A * | 9/1988 | Kogge et al. | ............ | 285/321 |
| 5,163,718 A * | 11/1992 | Cannon | ............ | 285/236 |

(Continued)

FOREIGN PATENT DOCUMENTS

CN    1732354    8/2006

(Continued)

*Primary Examiner* — David E Bochna
(74) *Attorney, Agent, or Firm* — Jacobson Holman PLLC

(57) ABSTRACT

A cuffed connection system for the transport of a particulate material includes a tube, a conduit, or a duct, and a flexible tube end that is received and snap fit so as to be inter-engaged within the tube, the conduit, or the duct. The snap fit inter-engagement is of a pair of outward circumferential forms each fit into a complementary receiving groove of a ferrule.

13 Claims, 13 Drawing Sheets

U.S. PATENT DOCUMENTS

| | | | |
|---|---|---|---|
| 5,176,406 A * | 1/1993 | Straghan | 285/330 |
| 5,190,322 A * | 3/1993 | Hughes | 285/236 |
| 5,308,123 A | 5/1994 | Zorn | |
| 5,443,098 A * | 8/1995 | Kertesz | 285/414 |
| 5,871,240 A * | 2/1999 | Miyajima et al. | 285/236 |
| 6,170,883 B1 * | 1/2001 | Mattsson et al. | 285/370 |
| 6,692,039 B2 * | 2/2004 | Topf, Jr. | 285/370 |
| 6,874,822 B2 * | 4/2005 | Yasuda et al. | 285/236 |
| 2006/0130287 A1 | 6/2006 | Weinhold | |

FOREIGN PATENT DOCUMENTS

| | | |
|---|---|---|
| DE | 3409954 | 9/1985 |
| DE | 102 61 557 A1 | 7/2004 |
| EP | 1 717 504 A1 | 11/2006 |
| FR | 2 676 680 | 11/1992 |
| JP | 11336974 | 12/1999 |
| JP | 2006-112547 | 4/2006 |
| PL | 205239 | 3/2010 |
| WO | WO 2004/059203 | 7/2004 |

* cited by examiner

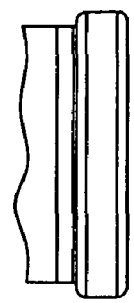  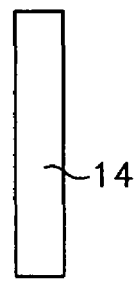
FIG. 5    FIG. 6    FIG. 7
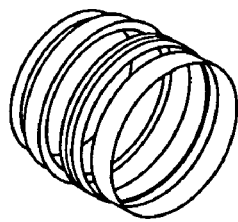 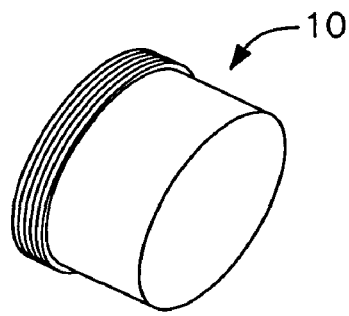
FIG. 9    FIG. 8

CUFFED CONNECTION SYSTEM ("BFM FITTING ASSEMBLY")

CROSS-REFERENCE TO RELATED APPLICATION

This is a national stage of PCT/NZ07/000096 filed May 2, 2007 and published in English.

This invention relates to apparatus suitable for transferring materials. More particularly the invention relates to components and assemblies whereby a flexible connection as a duct, passageway or the like ("duct") is or can be provided and be retained between components for a transfer of material or materials from one component or the other.

BACKGROUND OF THE INVENTION

1. Field of Invention

By way of example, component to component transfer can involve transfer of particulate materials under pressure, under vacuum, under gravity, or assisted by gravity, from a hopper or the like storage or accumulation vessel via a flexible duct to a conveyor, processing apparatus or plant or to a container. By way of further example, the transfer of particulate materials (whether a powder, granules, prills or other agglomerations) can be moved from a collection or the like vessel or hopper via a flexible connection (with or without the assistance of gravity or gas movement) to a receiving component, plant or the like. In the dairy industry for instance, milk, casein or other powders are to be transferred from a hopper to a downstream apparatus where the treating apparatus or the hopper is subject to vibration. In such a situation the flexible duct as a coupler leads to allows a reduction in the transfer of any vibration from one component to the other. This can be important to avoid damage, errors in weighing, etc.

2. Description of the Prior Art

It is currently known to hose clamp top and bottom such flexible ducts in a hose like manner about a discharge and/or receive tube. Such flexible ducts or hoses are made of many types of different material depending on the function they are to serve. They can primarily or solely be of a plastics material e.g. polyester, TEFLON™, KEVLAR™, or the like. They can be a fabric (synthetic or natural). They can be some combination of the foregoing.

Frequently such transfers are solely or partially under the effect of gravity or the like. There can be an input of vibration to assist discharge and/or movement. In some situations there can be gas or air entrainment. There can even be some gravity and/or vibrational assistance to any such air or gas entrainment system.

There is however a difficulty with traditional systems that use an encircling hose clamp about a rigid discharge or receiving tube as this leads to crevices that readily lend themselves to the trapping of materials. In the case of an industry such as the food industry (e.g. dairy included) or pharmaceuticals such capture can give rise to hygiene difficulties particularly if not cleaned regularly. The need to remove and replace a hose clamp makes such regular cleaning cumbersome.

SUMMARY OF THE INVENTION

The present invention envisages an alternative to such systems where as one connection between a flexible coupling tube or duct and a tube of, or for, component from or to which it is a duct, there is provided a snap lock arrangement reliant upon banding or ferruling at an end region (e.g. cuff) of the flexible tube or duct and a complementary recessed feature the tube of, or for, the component. Such a recessed feature preferably is a rolled ferrule recess to locate the preferably double beaded seal of the flexible tube.

It is envisaged that it is possible with such a cuff or the like snap locking feature that there can be a reduction in crevices owing to a more flush relationship in the connected passageways and/or a greater likelihood of regular cleaning owing to the snap fit arrangement.

In an aspect the invention is, as part of a particulate solids transport system, an assembly of or having an inter-engagement between a first tube and a second tube partly nested within the first tube, wherein the second tube is a flexible tube with an end region annularly supported by a band or cuff, and wherein the first tube has its end region provided with an annularly profiled set out, and wherein each of (a) the band or cuff and (b) the annularly profiled set out has at least one annular rib directed to the other, and at least one of (a) and (b) has two such ribs so as to have the rib of one engagingly flanked by ribs of the other, and wherein the band or cuff is resilient so as to be deformable inwardly of its tube axis to facilitate insertion or removal of the flexible tube from the first tube but with sufficient return bias to or towards a more relaxed condition such that the rib between two rib engagement holds the tubes against axial separation.

Preferably the two ribs are part of said band or cuff.

Preferably a resilient cylindrical ring underlies a profiled ring that provides the ribs of the band or cuff.

Preferably a fold back of a flexible sleeve of the second tube encloses said profiled ring and cylindrical ring.

Preferably the set out of the first tube has been roll formed.

Preferably the inner surface of the non-set out region of the first tube and the inner surface of the second tube are in alignment and are at least substantially flush one with the other.

In another aspect the invention is a said first tube and/or a said second tube.

In an aspect the invention is, in, as part of, or for apparatus to discharge, or to receive a discharge, of a particulate material, a tube, conduit, duct or the like adapted by a profiled zone, band or ferrule recessed to the inside to receive a complementary resilient zone, band or ferrule of a flexible tube, conduit, duct or the like.

Preferably there are two annular grooves, each to locate a ridge of the cuff of the connector.

Preferably said tube, conduit, duct or the like is a first tube as defined above.

Preferably profiled zone, band or ferrule is a roll formed feature.

Preferably said roll formed feature is its adaption to locate a double beaded seal (i.e. a cuff or other end modification outwardly of a flexible tube that has two spaced annular beads, ribs or the like).

In an aspect the invention is, in, as part of, or for apparatus to discharge, or to receive a discharge, of a particulate material, a tube, conduit, duct or the like adapted by a profiled band or ferrule to the inside to receive a complementary resilient band or ferrule of a flexible tube, conduit, duct or the like ("duct").

Preferably said tube, conduit, duct or the like is a first tube as defined above.

Preferably the complementary resilient band requires some inward distortion from which it recovers to allow its fit and hold to the said tube, conduit, duct or the like on its profiled band or ferrule.

Preferably said tube, conduit, duct or the like is a first tube as defined above.

Preferably profiled zone, band or ferrule is a roll formed feature.

Preferably said roll formed feature is its adaption to locate a double beaded seal (i.e. a cuff or other end modification outwardly of a flexible tube that has two spaced annular beads, ribs or the like).

Preferably there are two annular grooves, each to locate a ridge of the cuff of the connector.

In another aspect the present invention consists in a tube having a ducting locus and profiled region within which a resiliently banded or ferruled end region of a flexible tube or duct is to fit, the tube profiled region having
 (i) an annular channel set out from its ducting locus,
 (ii) inwardly directed annular rib set out less than the channel, and
 (iii) an annular set out (rebate or channel) out from that annular rib, feature (iii) being closest to that end of the tube from which the flexible duct is or is to be removeably fixed.

The features (i), (ii) and (iii) preferably are consecutive i.e. without any interposed other profiling features. In alternative forms however there can be some alternative profiling features.

Preferably said tube, conduit, duct or the like is a first tube as defined above.

Preferably profiled zone, band or ferrule is a roll formed feature.

Preferably said roll formed feature is its adaption to locate a double beaded seal (i.e. a cuff or other end modification outwardly of a flexible tube that has two spaced annular beads, ribs or the like).

Preferably said tube is at least substantially rigid i.e. preferably is for example stainless steel.

In another aspect the invention is as, or adapted to be used as, a flexible coupling tube to duct particulate material from a discharge tube, conduit, duct, port, or the like and/or to a receiving tube, conduit, duct, port or the like,
 wherein at least one end region of the tube is resiliently banded or ferruled and has for that banded or ferruled zone an external profile adapted to mate after a return from a distorted form of the banded or ferruled zone in a complementary internal profile of a said discharge tube, conduit, duct.

Preferably said flexible coupling tube is a said second tube as defined above.

In another aspect the present invention consists in a flexible duct that has a cuff or other end region adapted to resiliently fit to such a profiled tube at least in part into said channel, over said set in and into said rebate or additional channel.

Preferably said duct is of a form substantially as herein described with reference to components assemblies, methods and/or as hereinafter described with or without reference to any one or more of the accompanying drawings.

Preferably said flexible coupling tube is a said second tube as defined above.

In another aspect the invention is, in, as part of, or for apparatus to discharge, or to receive a discharge of, a particulate material, (A) a tube, conduit, duct or the like and (B) a flexible tube (end received and snap fit inter-engaged within said tube, conduit, duct or the like).

Preferably the receiving has required a resilient deformation of an end region of the tube, conduit, duct or the like from which it has relaxed to, or been allowed to relax to, a condition that holds it engaged by profiled interference features with said tube, conduit, duct or the like.

Preferably in the relaxed condition there is substantial alignment of the resilient tube, conduit, duct or the like with a wall region of said tube, conduit, duct or the like.

Preferably (A) is a said first tube as defined above and (B) is a said second tube as defined above.

Preferably said tube, conduit, duct or the like is a first tube as defined above.

Preferably profiled zone, band or ferrule is a roll formed feature.

Preferably said roll formed feature is its adaption to locate a double beaded seal i.e. a cuff or other end modification outwardly of a flexible tube that has two spaced annular beads, ribs or the like.

Preferably the roll formed feature defines a tubed profile region having
 (i) an annular channel set out from its ducting locus,
 (ii) inwardly directed annular rib set out less than the channel, and
 (iii) an annular set out (rebate or channel) out from that annular rib, features (iii) being closest to that end of the tube from which the flexible duct is or is to be removeably fixed.

In a further aspect the present invention consists in, in combination, a tube as defined with its profiled region, and a flexible tube or duct having a banded or ferruled end region that complements the profiled region of said tube.

Preferably the complementing is as a result of a cuff or other set up feature of the flexible duct, such features being supported by a resilient ring which ensure intimate intermeshing notwithstanding any inward distortion of such resilient ring during a fitting or removal and refitting procedure.

In another aspect the present invention consists in, in combination or assembly, a tube and a flexible duct received within said tube, the flexible duct having a resiliently provided end feature to engage as if meshed or otherwise engaged against easy axial dislodgement, such meshing or other such engagement requiring a resilient deformation of the flexible duct end to allow its initial insertion before it assumes and holds its relaxed condition which is commensurate with such meshing or other engagement.

In still another aspect the present invention consists in a method of fitting and/or removing a flexible duct or tube which is substantially as herein described in respect of any apparatus, combination or assembly in accordance with the present invention.

In another aspect the invention is as, or adapted to be used as, a flexible coupling tube to duct particulate material from discharge tube, conduit, duct, port, or the like and/or to a receiving tube, conduit, duct, port or the like,
 wherein at least one end region of the tube is resiliently banded or ferruled and has for that border banded or ferruled zone an external profile adapted to mate after a return from a distorted form of the banded or ferruled zone with a complementary internal profile of a said discharge tube, conduit, or duct.

Preferably said tube, conduit, duct or the like is a first tube as defined above.

Preferably profiled zone, band or ferrule is a roll formed feature.

Preferably said roll formed feature is its adaption to locate a double beaded seal i.e. a cuff or other end modification outwardly of a flexible tube that has two spaced annular beads, ribs or the like.

In another aspect the invention is plant having a discharge tube or port or a receiving tube or port for the ducted passage of a particulate material,
 wherein a flexible tube connects the discharge tube to the receiving tube or port, and wherein there is at least one tube to tube connection reliant on a resilient end region of the flexible tube having been deformed to allow its insertion and then assumption of a secure more relaxed condition of said end region in the encircling tube.

Preferably said tube, conduit, duct or the like is a first tube as defined above.

Preferably profiled zone, band or ferrule is a roll formed feature.

Preferably said roll formed feature is its adaption to locate a double beaded seal i.e. a cuff or other end modification outwardly of a flexible tube that has two spaced annular beads, ribs or the like.

In another aspect the invention consists in, in a particulate material(s) transport system, a flexible material(s) ducting tube held at least one of its end regions within a less flexible or rigid tube reliant on an annular profile into annular profile inter-engagement
wherein there is or has been one or both
(i) resilient deformation of said end region to a non relaxed condition to allow its insertion to a more relaxed or fully relaxed held condition, and/or
(ii) notwithstanding the profile to profile inter-engagement, the surfaces of the connected tubes are otherwise flush.

As used herein "tube" includes any appropriate section but preferably at the inter-engagement contemplates a round relaxed or round rigid section and "tube axis" and "tube locus" takes its meaning therefrom.

As used herein the term "and/or" means "and" or "or", or both.

As used herein the term "(s)" following a noun includes, as might be appropriate, the singular or plural forms of that noun.

BRIEF DESCRIPTION OF THE DRAWINGS

A preferred form of the present invention will now be described with reference to FIGS. 1a and 1b which show by reference to a diagrammatic section of one side only of discharge and receiving tubes and a flexible tube, a top connection and a bottom connection, each connection relying on an internal profiling of the discharge tube and the receiving tube and the complementary engagement thereto in an outwardly biased manner a complementary profile of the banded or ferruled region at the end of the flexible tube, both FIGS. 1a and 1b showing by reference to the flexible tube proper (i.e. between and into its profiled end features) the alignment thereof at least substantially with the inner wall surface of the discharge tube and the receiving tube respectively, FIG. 5 shows an outside view of the flexible tube feature as shown in FIG. 4, FIG. 6 shows the profile ring in the same disposition as is FIG. 5 that forms part of the fabricated arrangement of FIG. 5, FIG. 7 shows similarly to FIG. 6 the underlying stainless steel or other material resilient ring shown in FIG. 4, FIG. 8 is a perspective view of the arrangement of FIG. 3 as it might be provided as a short length to be welded to a discharge port of appropriate apparatus e.g. a hopper, receiving apparatus or the like, FIG. 9 somewhat analogously to FIGS. 5, 6 and 7 shows from the right the ring of FIG. 7, the profiled ring of FIG. 6 and the cuff of the flexible tube forming material itself as shown in FIG. 5 or the assembly as shown in FIGS. 4 and 5.

DETAILED DESCRIPTION OF THE PREFERRED EMBODIMENTS

Figure 1A:
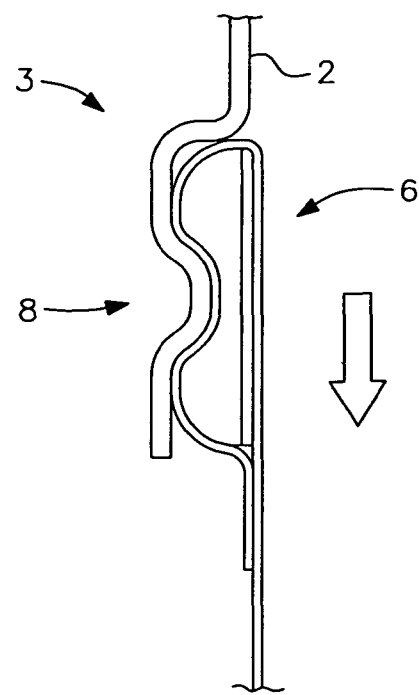

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

In the preferred form of the present invention the flexible tube in accordance with the present invention is of any suitable flexible material (even a woven material). It provides a tube form able to be held substantially in its tubular ducting form so as to provide a wall 1 able to be substantially aligned with a wall 2 of a discharge tube 3 and a wall 4 of a receiving tube 5. Preferably top and bottom of the flexible tube there is a band or ferrule 6 and 7 respectively which is each adapted to conform and engage outwardly into a complementary profiled region 8 and 9 respectively of the members 3 and 5.

Figure 2:
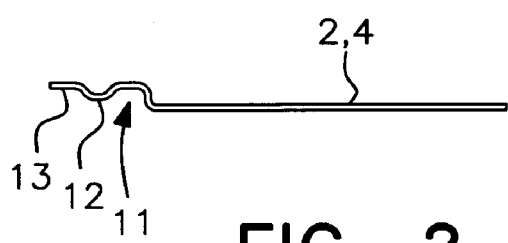
FIG. 2 is a view of a discharge tube or receiving tube to show the features of the end profiling thereof by way of a forming outwardly by any appropriate roll forming or other forming means to define (i) an annular channel set out from its ducting locus, (ii) inwardly directed an annular ribbed set out less than the channel and (iii) an annular set out (in this case a rebate rather than a channel) out from that annular rib.
Figure 3:
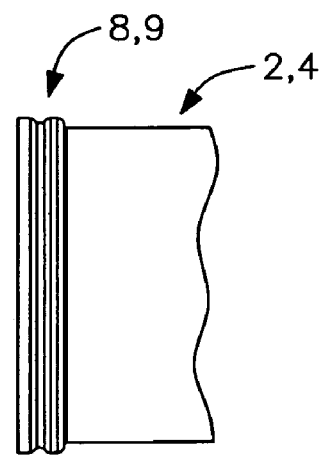
FIG. 3 shows one end of a discharge or receiving tube from the outside, there being shown (to the left) the outwardly rolled features that provide the set ins and rib, etc described with respect to FIG. 2.

FIG. 2 shows one wall of a short tube 10 as shown in FIG. 8.

Shown in FIG. 2 is respectively an annular channel set out from the ducting locus, such channel being shown as 11, an inwardly directed and annular rib 12 set out less than the channel 11 and an annular set out rebate (but it could be a channel) 13 out from that annular rib 12.

Figure 4:
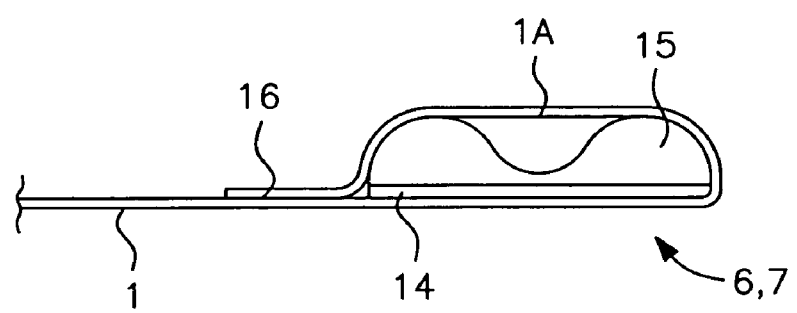
FIG. 4 is a sectional view of a preferred cuff like profiling of the perimeter of the receiving or discharge end of a said flexible tube, the cuff being formed by a fold around and reattachment of part of the flexible preferably non-resilient material of the cuff itself over an underlying resilient ring (e.g. of stainless steel or other resilient material) and a contoured ring best to conform to the inner profile of the end region of the discharge tube or receiving tube.

The end feature as shown in FIG. 4 comprises the sleeve of the preferred material of the flexible tube. This material is preferably at least substantially, if not totally, gas impervious as its role is to convey particulate materials rather than to separate particulate materials from any air or gas that may be moving therewith, whether as an entrainment flow or not.

Figure 1B:
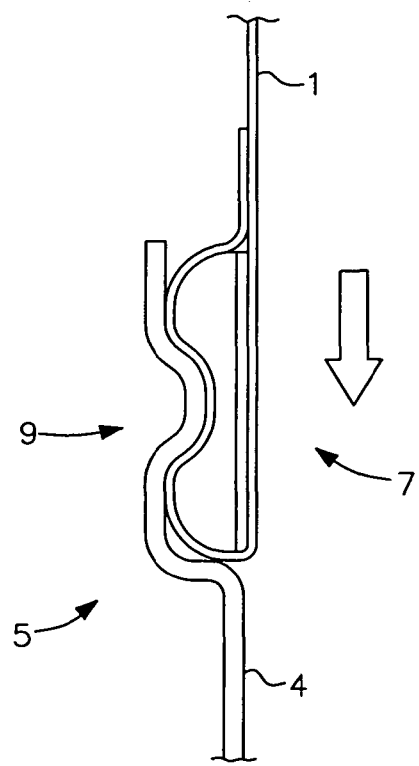

The material 1 extends to a foldback region 1A from which it can be deformed inwardly as in the inter-engagement form shown in FIGS. 1A and 1B.

The cuff region 6 or 7 as shown, which is to act to the outside in its inter-engagement, has a surround first of a resilient ring 14 as a snap band and there over a profiled ring 15. The assembly of profiled ring 15 about the resilient ring 14 has been captured onto the material 1 by the fold back region 1A which is then attached by adhesively and/or stitching at 16.

The resilient ring 14 and the profiled ring 15 need not be adhered one to the other but can be if desired.

Such an arrangement shown in FIG. 4 is then able to inter-engage in a holding engagement with the interior profile of regions 8 and 9 of discharge tube 3 or receiving tube 5 respectively.

Figure 10:
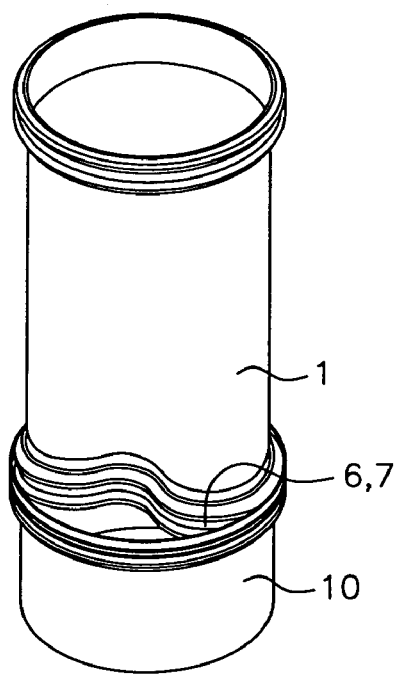
FIG. 10 shows the manual deformation of one end of a flexible tube in accordance with the present invention to allow its "snap" placement within the profiled end region of a discharge or receiving tube with a complementary profile.
Figure 11:
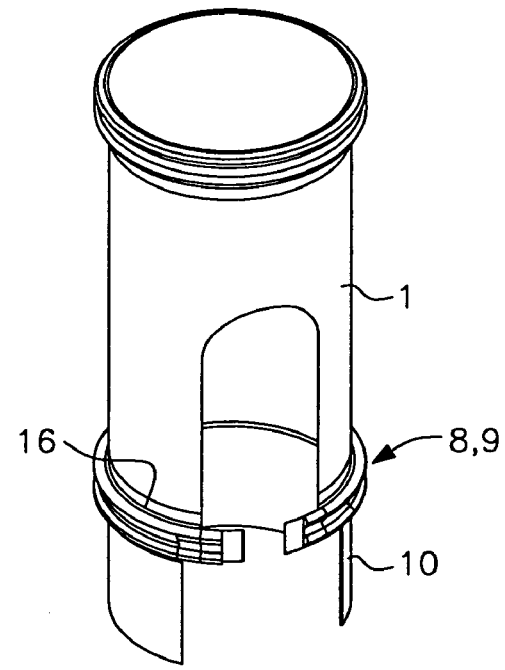
FIG. 11 shows the flexible tube engaged within tube for attachment at a port, the flexible tube and complementary profile in part being cut away to show more.
Figure 12:
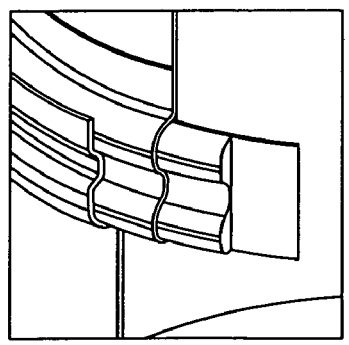
FIG. 12 is an enlargement of part of FIG. 11.
Figure 13:
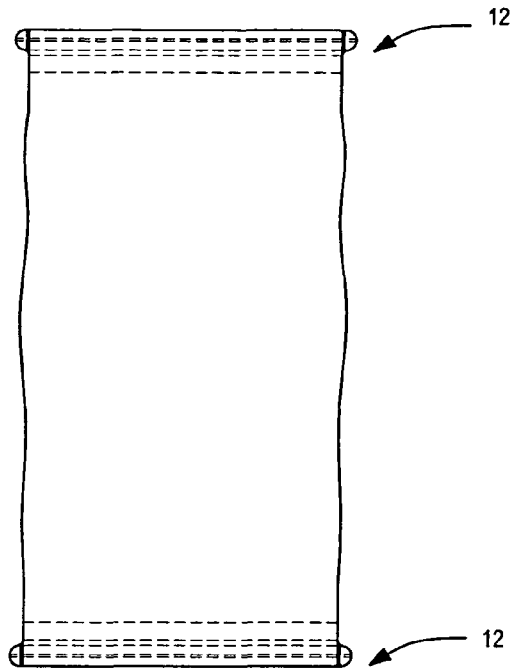
FIG. 13 is a side elevation of an alternative flexible connector this time having similar ends but each of which has a single annular rib supported by a flexible member.
Figure 14:
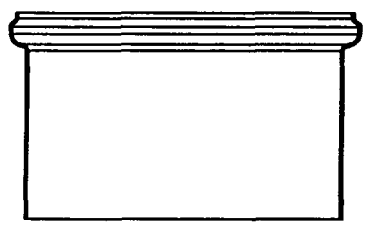
FIG. 14 shows the complementary profile spigot to receive either end of a connector of FIG. 13.
Figure 15:
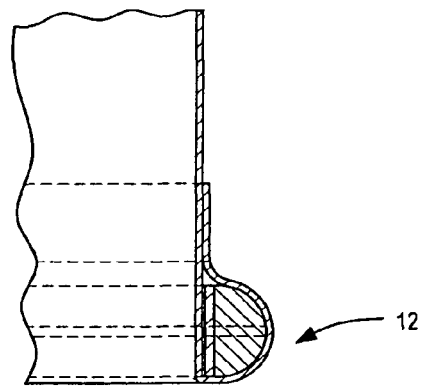
FIG. 15 is a sectional view of part of the section of the flexible connector at the single annular rib.
Figure 16:
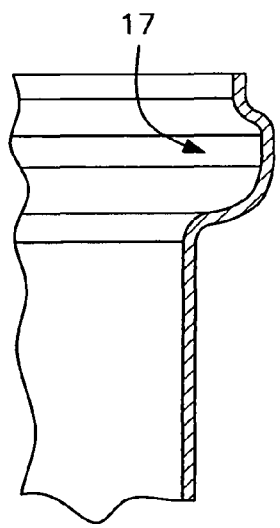
FIG. 16 is an enlargement of the complementary profile of the spigot connector of FIG. 14.
Figure 17:
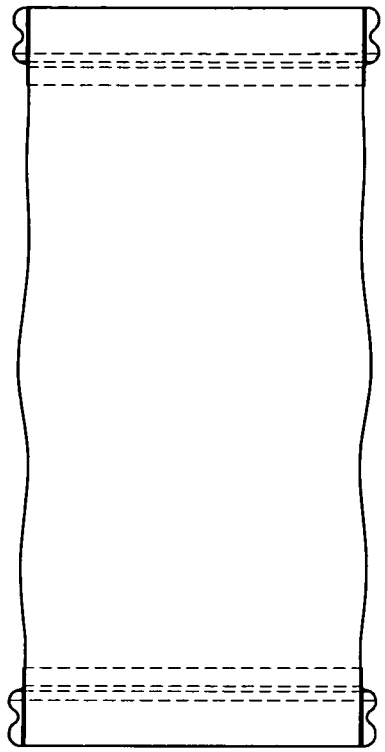
FIG. 17 is a similar diagram to that of FIG. 13 but of a double annular ribbed flexible connector of a kind substantially as previously described, this time the connector being shown in the same drawing format as FIG. 13.

A preferred method if inter-engaging is as shown in FIG. 10. Here you will see there is a ring 10 having an cuff region 6 or 7 of a flexible ring fitted there into reliant upon the deformability and resilience of the resilient ring (such as a snap band) 14. Upon release from the condition as shown in FIG. 10 a firm inter-engagement as shown in FIGS. 1A and 1B will result. To remove the flexible ring from the inter-engagement as shown in FIGS. 1A and 1B there is a similar distortion required to enable its ready removal.

In preferred forms of the present invention a suitable plastics material can be used for the profiled ring 15. The profiled ring 15 is shape retaining but can be resilient so that it can conform to the deformation required of the resilient ring 14 which preferably is of a suitable material e.g. a suitable steel (preferably stainless steel) or could be some appropriate composite or plastics material.

Many different materials single or multiple can be used for the flexible seal. One choice for the flexible sleeve proper is Clearflex™ sleeve material which a plastics material having little resilience but being flexible.

The sleeve can be formed from a film material, from fibres (e.g. of a non-woven material or a woven material), or some combination of them both e.g. a hybrid. Fibre examples include polyester, nylon, KEVLAR™, PTFE, polyurethane, TEFLON™, aramid, PP, etc.

As mentioned hybrids of a woven or non-woven material (i.e. formed from fibres) can be used in conjunction with film. One such example is a KEVLAR™ woven fabric and a polyurethane film.

Depending on usage preferably the inner surface of the flexible sleeve is to a food grade.

Alternative materials to any of those described can be used. There is no need for the material of the flexible tube to be homogeneous, i.e. it can have localised regions of different properties (e.g. material, rigidity, etc) if that is desirable in a particular application.

Accordingly, any suitable choice of material or materials or variation of the same material or same materials can be used as can any appropriate hybridisation of the structure for example a combination of KEVLAR™/SEEFLEX40 when cuffed by a cuff of the present invention provides much greater explosive resistance than a conventionally fitted SEEFLEX™ flexible coupler. SEEFLEX is a trademark of BFM Fitting, Auckland, New Zealand and is a clear polyester based thermoplastic polyurethane alloy material.

A person skilled in the art will appreciate how with the substantial flushness possible as shown in FIGS. 1A and 1B there is little in the way of collection areas for particulate materials such as food powders. These should be easily dislodged by regular cleaning without disassembly in conjunction with the vibrational nature of the structure. Periodic removals of the flexible tube are easy as there is no encircling hose clamp to remove and replace. Removal and replacement is simple.

In some forms of the present invention some additional outside tethering arrangement can, if desired, be provided to ensure that any failure in use is unlikely to be catastrophic. Such external tethering however is not preferred.

Whilst there has been description of a particular profiling of the end of each of the tubes in question, other profiled end forms are within the scope of the invention that provide for appropriate retention. These may include one or more annular rib. They may include one or more channel. It is preferred that the profiling be of an annular nature rather than helical or otherwise.

It is believed that the present invention provides industry with a useful alternative to existing apparatus and methodologies.

FIGS. 13 through 16 as described show a single annular rib 12 at each end of a flexible connector adapted to be received by a complementary profile. Each rib is analogously made to the twin rib form already described.

Similar set outs etc. 17 exist for the single annular rib interengagement as for the double annular rib interengagement previously described.

FIGS. 17 through 20 show in a similar style to FIGS. 13 to 16 a double annular rib series of drawings.

Irrespective of whether or not the annular connector is single ribbed at one end or double ribbed, or as a hybrid of both, persons skilled in the art will appreciate how the system works.

Figure 18:
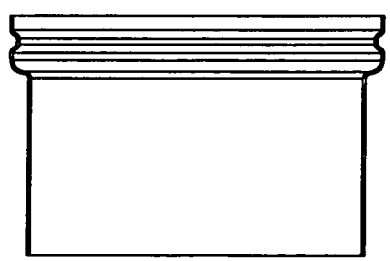
FIG. 18 is a complementary spigot connector for the flexible connector of FIG. 17.
Figure 19:
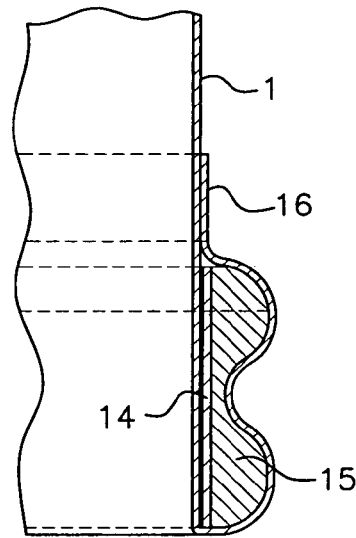
FIG. 19 is a cross-sectional enlargement of the double annular rib of the flexible connector of FIG. 17.
Figure 20:
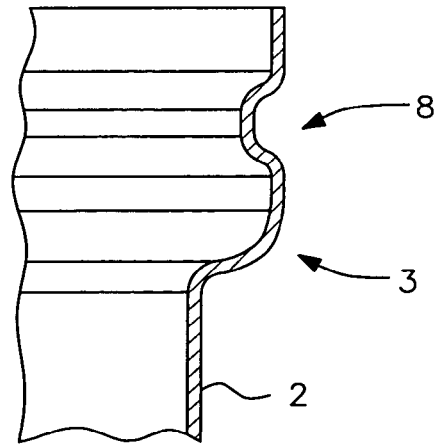
FIG. 20 is an enlargement of the profile of the spigot connector of FIG. 18.
Figure 21:
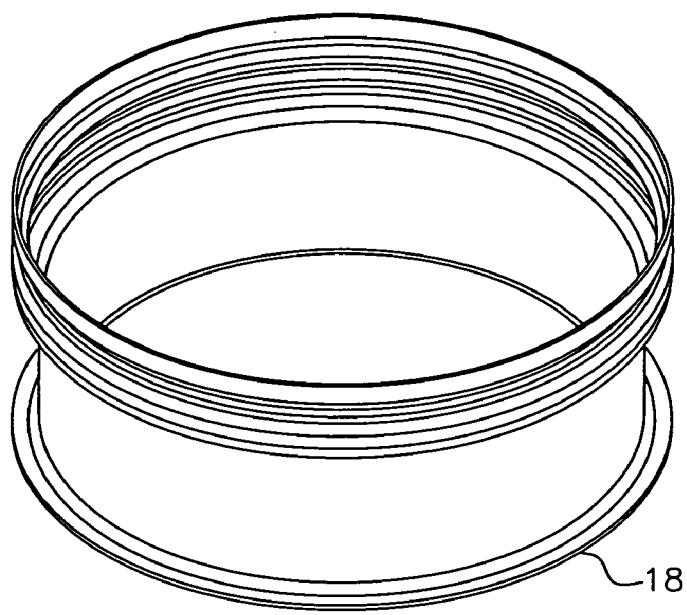
FIG. 21 shows an alternative spigot connector, whether for a single or double rib flexible connector (FIG. 21 actually showing a region to receive a double annular ribbed flexible connector), but having its other end provided with an outward flange adapted for fixing (e.g. by welding) or being retained on an appropriate opening or port.
Figure 22:
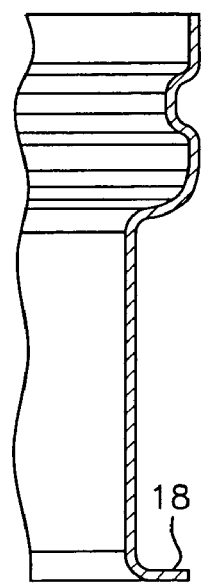
FIG. 22 is a cross section of part of the spigot connector of FIG. 21.

FIGS. 21 and 22 show a variation of the spigot of FIGS. 18 and 20 to the extent that there is provided an outwardly extended flange 18 at the bottom adapted itself to be welded to an appropriate surface about an opening or to be captured by an appropriate capture device.

Figure 23:
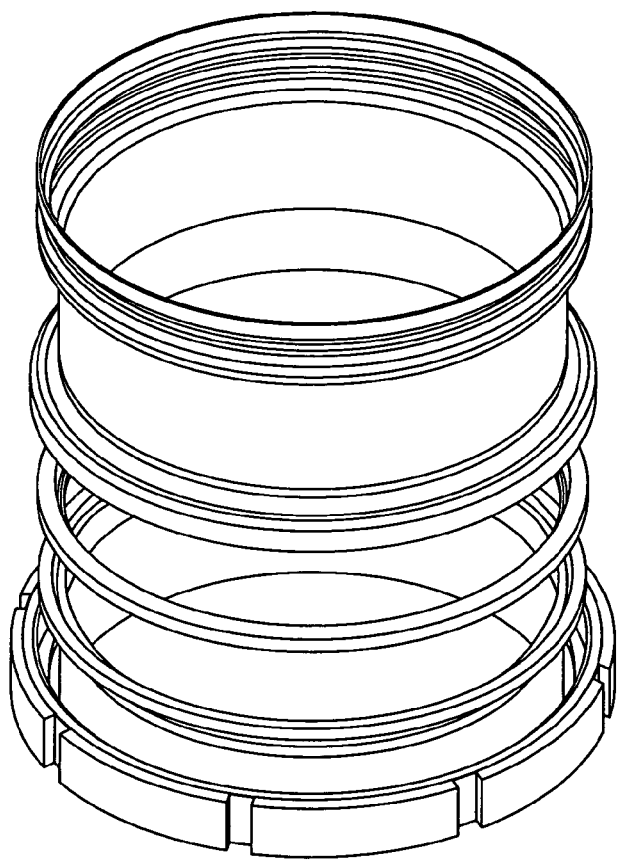
FIG. 23 is an exploded view of a variation of a spigot connector such as shown in FIG. 21 but this time adapted for engagement with multiple components at or about an appropriate opening.
Figure 24:
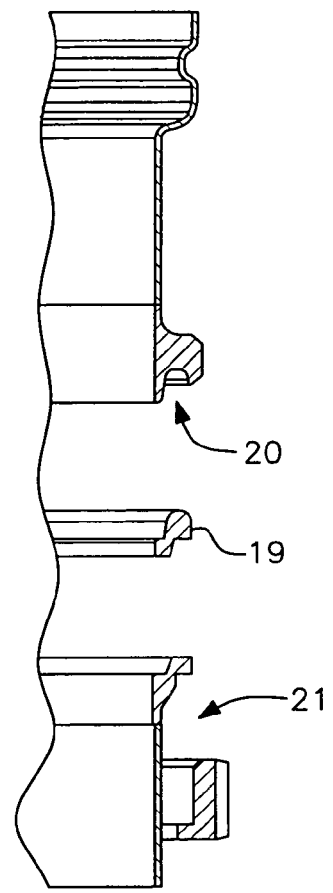
FIG. 24 shows the components of FIG. 23 in section.

FIG. 23 shows a variation on such a theme, i.e. with a structure adapted to seal with a seal 19 into a bottom end of a connector at 20, the connector of FIGS. 23 and 24 being adapted to sit down on the appropriate annular seal 19 itself seating to a member 21.

Figure 25:
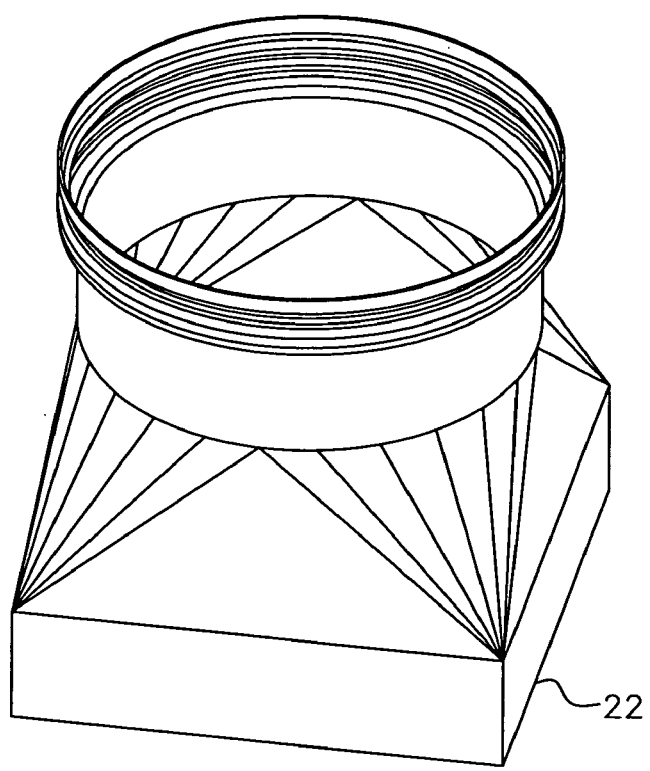
FIG. 25 shows yet a further variation of the spigot connectors of FIGS. 21 and 23, this time being adapted for a square opening at the end remote from the end profiled to receive a double annular ribbed flexible connector.
Figure 26:
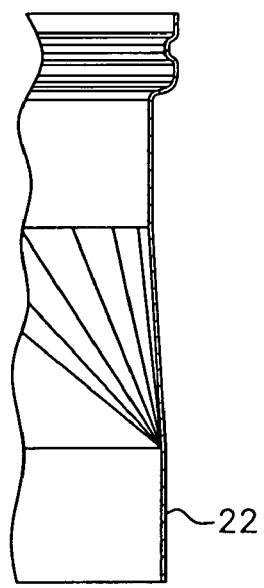
FIG. 26 is a cross-section of the spigot connector of FIG. 25.
Figure 28:
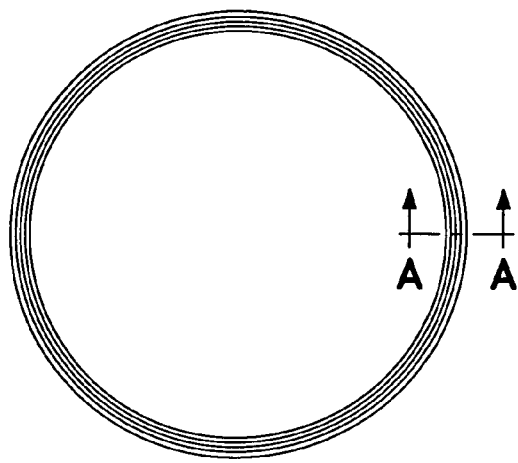
FIG. 28 is a plan view of the spigot connector of FIG. 27.
Figure 27:
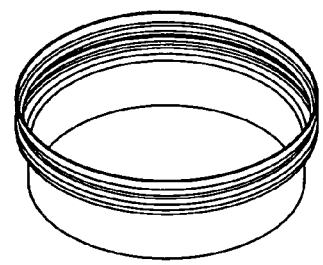
FIG. 27 is a perspective view of a most preferred form of the ferrule or spigot connector.
Figure 29:
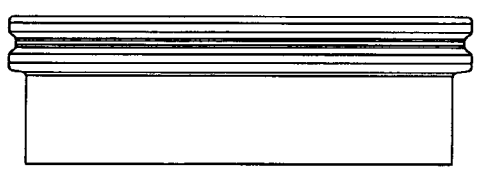
FIG. 29 is an elevational view of the spigot of FIGS. 27 and 28.
Figure 30:
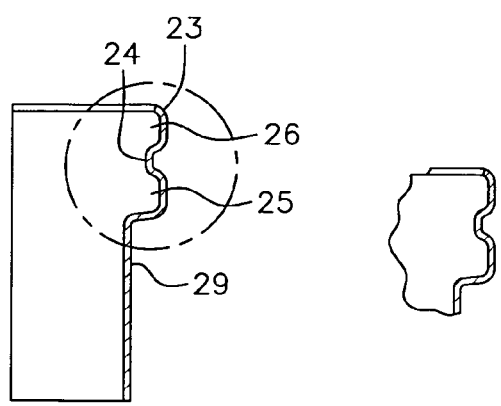
FIG. 30 is the detail at section AA of FIG. 28 when being viewed in elevation.

FIGS. 25 and 26 show how a complementary member such as shown in FIG. 20 can instead of maintaining the same general tubular form can evolve into other geometric forms. In the case of FIGS. 25 and 26 it evolves into a square tubular form 22 adapted for attachment to a square port or conduit.

Figure 31:
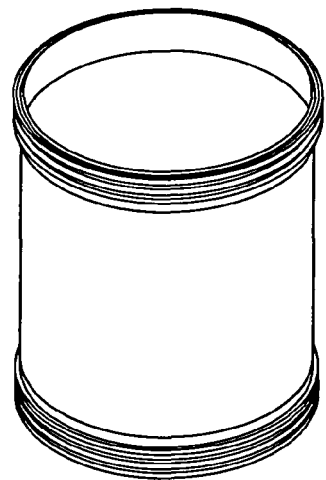
FIG. 31 is a similar flexible connector to that previously described.
Figure 32:
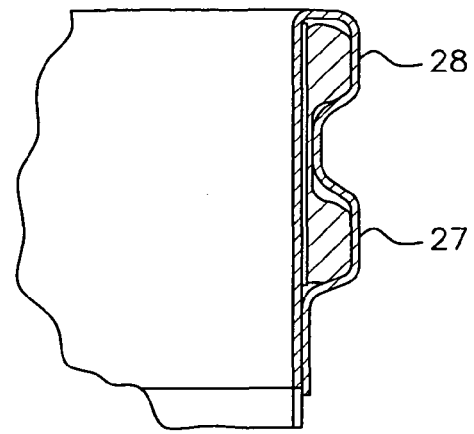
FIG. 32 is the detail in section of the resilient ends of the flexible connector of FIGS. 31 and 31A.
Figure 37:
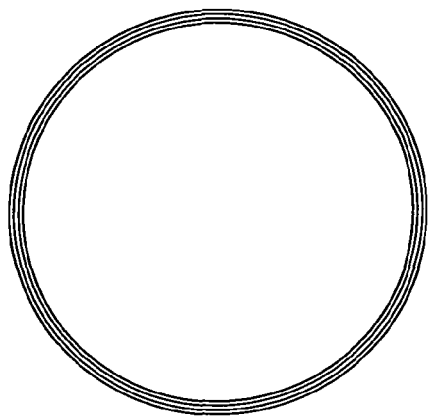
FIG. 37 is a cross-sectional end view of the flexible connector shown in FIG. 31.
Figure 38:
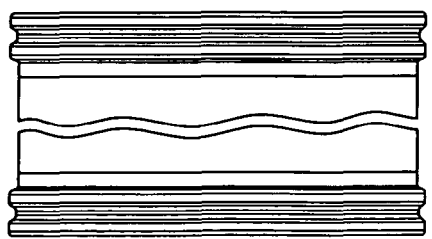
FIG. 38 is an enlarged partial side view of the ends of the flexible connector of FIG. 31.
Figure 39:
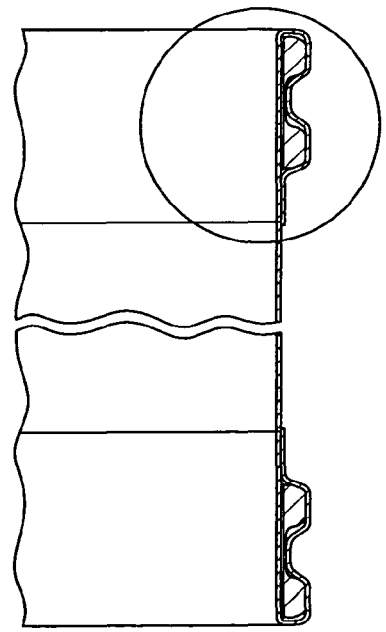
FIG. 39 is an enlarged partial side view of the resilient ends of the flexible connector of FIG. 38.

FIGS. 27 through 30 show a most preferred form of the spigot or ferrule. It can be of a metal (steel or SS) plastic or a combination of materials. This form has an inturned region 23 thus meaning that the inwardly directed ridge 24 separates two complete annular retention grooves 25 and 26 able to accommodate respectively lip parts 27 and 28 respectively of a flexible connector end as shown in FIGS. 31, 31A and 32.

This shaping of the distal part to match the connector does two things—ensures a seal on two lip parts (27 and 28) and ensures less gap with the connector exteriorly to collect dust and dirt.

An over sleeve, for example of explosion suppressing Kevlar, can be provided to slip over the flexible connector and, if desired, extend over the spigot at each end. If desired it can be clamped for example by any clamping method onto the surface 29 or it can be left free but with sufficient lapping to ensure adequate explosion protection.

Figure 31A:
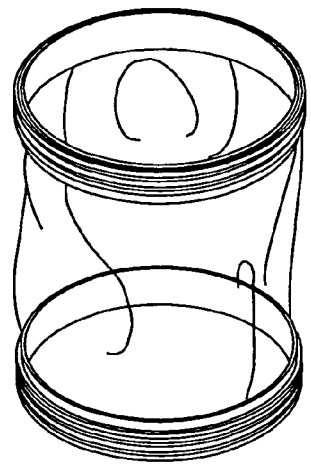
FIG. 31A shows the flexibility of the connector, the connector of FIGS. 31 and 31A being adapted for retention by a spigot as in FIGS. 27 through 30.
Figure 33:
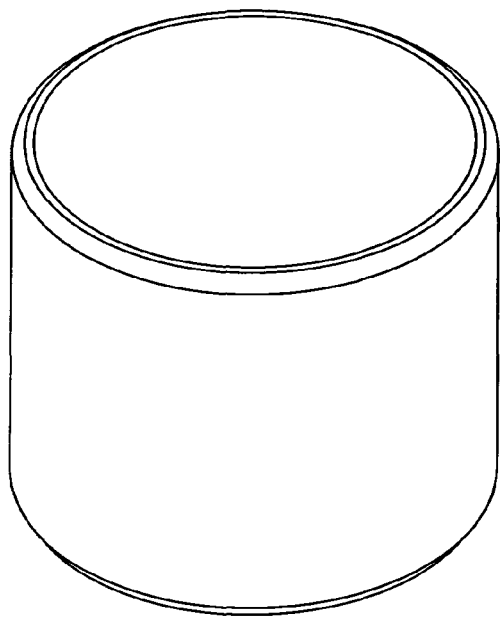
FIG. 33 is a plan view of an over sleeve that can be used and, if desired, be attached by any appropriate means (e.g. a hose clamp) or none at all to provide resistance to explosions.
Figure 34:
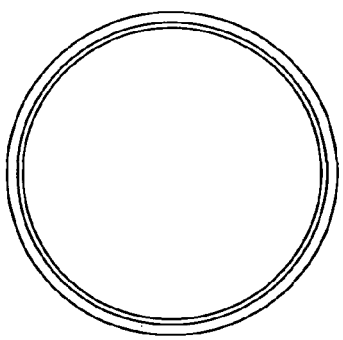
FIG. 34 shows such a sleeve in plan view.
Figure 35:
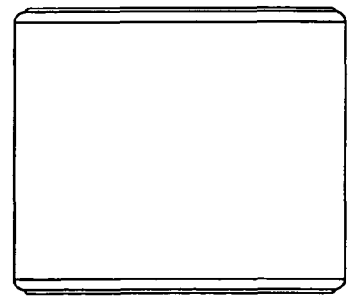
FIG. 35 shows the sleeve of FIGS. 30 through 35 in elevation.
Figure 36C:
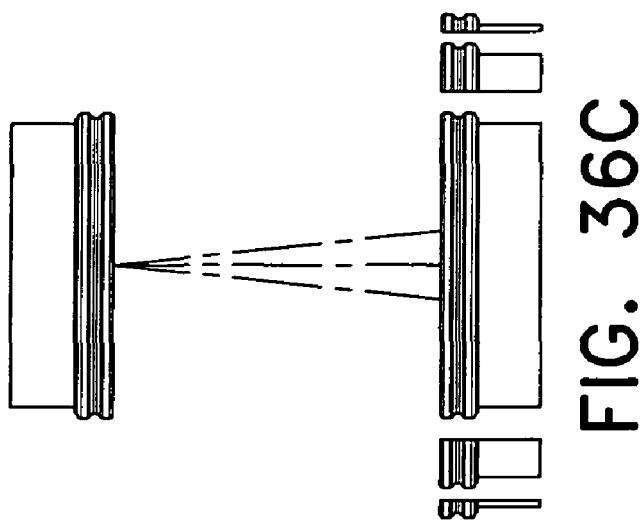
FIG. 36 shows with FIGS. 36A, 36B and 36C appropriate lengths and spacings, FIG. 36A being for in line static equipment, 36B being for offset equipment and FIG. 36C being for vibrating equipment.
Figure 36B:
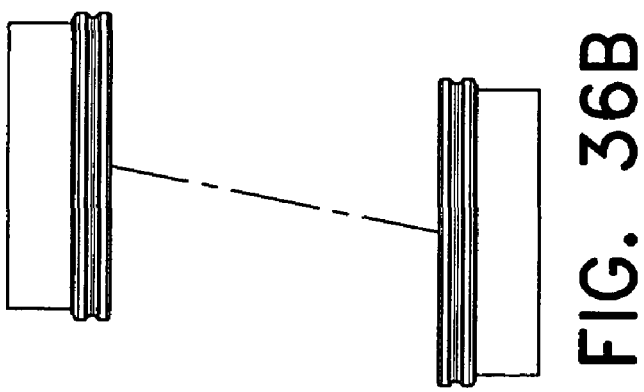
Figure 36A:
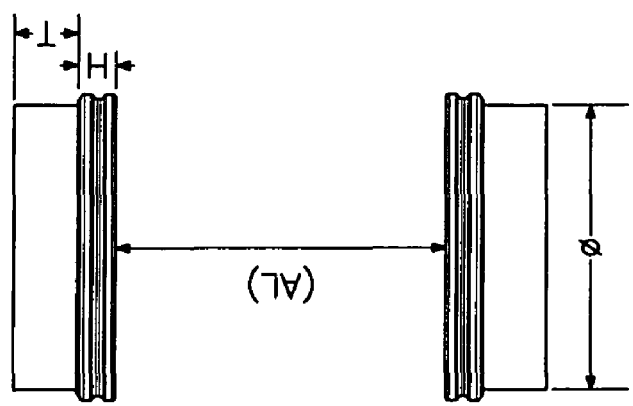

FIG. 31A shows the flexibility of the connector but even though it is connected, attention should be paid to FIGS. 36A through 36C.

Ø inside diameter of both spigot and connector ends in mm—options suggested being in Table 1
AL separation of spigots in mm
CL connector length in mm
H is spigot or ferrule head/retention profile length (e.g. preferably about 35 mm)
T Is spigot or ferrule tail length (e.g. preferably about 52 mm)

Suitable internal diameters for the tail and inside of each end of the connectors is preferably one of the following from the Table.

TABLE 1

| Ø (Diameter) | Length (CL) |
| --- | --- |
| 100 | 150 |
| 150 | 150 |
| 200 | 200 |
| 250 | 200 |
| 300 | 300 |
| 350 | 300 |
| 400 | 300 |
| 450 | 300 |
| 500 | 300 |
| 550 | 300 |
| 600 | 300 |
| 650 | 300 |

For a diameter Ø (e.g. which can be any of those shown in the Table), the distance AL between the spigots relates to a connector length CL as follows:

Spacing AL for in line static equipment as shown in FIG. 36A should be the connector length CL minus 10 mm. For the off set equipment of FIG. 36B, the spacing AL should be the connector length CL minus 20 mm. For vibrating equipment the spacing AL should be the connector length CL minus 40 mm.

Advantages Include:
Advantages from at least preferred embodiments of the invention are:
more hygienic
  Perfect fit
  No crevices
  No build up of product
less susceptible to damage
  no hose clips needed
  no tools needed
  no damage as a consequence
explosion resistant
  can be provided with better resistances to internal explosions than conventional flexible couplers
fast simple replacement
effective sealing
  no leaks In this specification where reference has been made to patent specifications, other external documents, or other sources of information, this is generally for the purpose of providing a context for discussing the features of the invention. Unless specifically stated otherwise, reference to such external documents is not to be construed as an admission that such documents, or such sources of information, in any jurisdiction, are prior art, or form part of the common general knowledge in the art.

The invention being thus described, it will be apparent that the same may be varied in many ways. Such variations are not to be regarded as a departure from the spirit and scope of the invention, and all such modifications as would be recognized by one skilled in the art are intended to be included within the scope of the following claims.

What is claimed is:
1. An assembly as part of a particulate solids transport system, comprising
  an inter-engagement between a first tube and a second tube partly nested within the first tube,
  the second tube being a flexible tube with an end region annularly supported by a band or cuff, the first tube having an end region thereof provided with an annularly profiled set out, each of the band or cuff and the annularly profiled set out having at least one annular rib directed to the annular rib of each other, and at least one of the band or cuff and the annularly profiled set out having two of the ribs so as to have the rib of the band or cuff and the annularly profiled set out engagingly flanked by the two ribs of the other of the band or cuff and the annularly profiled set out, and the band or cuff being resilient so as to be deformable inwardly of a tube axis thereof to facilitate insertion or removal of the flexible second tube from the first tube and with sufficient return bias to or towards a more relaxed condition such that the rib between a two rib engagement holds the first and second tubes against axial separation from each other, the band or cuff having a resilient cylindrical ring that underlies a profiled ring, the profiled ring providing the ribs of the band or cuff, and the second tube including a flexible sleeve with a fold back portion that encloses the profiled ring and the cylindrical ring.

2. The assembly of claim 1, wherein the two ribs are part of the band or cuff.

3. The assembly of claim 1, wherein the set out of the first tube has a roll formed construction.

4. The assembly of claim 1, wherein an inner surface of a non-set out region of the first tube and an inner surface of the second tube are in alignment and are at least substantially flush one with each other.

5. The assembly of claim 1, wherein the band or cuff has two parallel annular ribs and the first tube has two parallel complementary grooves that each conform to a corresponding one of the annular ribs of the band or cuff and which connect via the rib of the first tube.

6. A system that can be assembled to provide for the transport of particulate solids, and then disassembled, comprising:

a connectable and disconnectable inter-engagement between a first tube and a second tube partly nested within the first tube, the second tube being a flexible tube with an end region annularly supported by a band or cuff, the first tube having an end region thereof provided with an annularly profiled set out, each of the band or cuff and the annularly profiled set out having at least one annular rib directed to the annular rib of each other, and at least one of the band or cuff and the annularly profiled set out having two of the ribs so as to have the rib of the band or cuff and the annularly profiled set out engagingly flanked by the two ribs of the other of the band or cuff and the annularly profiled set out, and the band or cuff being resilient so as to be deformable inwardly of a tube axis thereof to facilitate connection or disconnection of the flexible second tube from the first tube and with sufficient return bias to or towards a more relaxed condition such that the rib between a two rib engagement holds the first and second tubes against axial separation from each other, the band or cuff having two parallel annular ribs and the first tube having two parallel complementary grooves that each conform to a corresponding one of the annular ribs of the band or cuff and which connect via the rib of the first tube.

7. A flexible coupling tube to duct particulate material from a discharge tube, conduit, duct, or port, and/or to a receiving tube, conduit, duct, or port, the flexible coupling tube comprising:

at least one end region that is resiliently banded or ferruled and that has an external profile adapted to mate, after a return from a distorted form of the banded or ferruled region, in a complementary internal profile of at least one of the discharge tube, conduit, duct, or port and the receiving tube, conduit, duct, or port, and the flexible coupling tube being a second tube of an assembly as part of a particulate solids transport system, the assembly including an inter-engagement between a first tube and the second tube partly nested within the first tube, the second tube being a flexible tube with an end region annularly supported by a band or cuff, the first tube having an end region thereof provided with an annularly profiled set out, each of the band or cuff and the annularly profiled set out having at least one annular rib directed to the annular rib of each other, and at least one of the band or cuff and the annularly profiled set out having two of the ribs so as to have the rib of the band or cuff and the annularly profiled set out engagingly flanked by the two ribs of the other of the band or cuff and the annularly profiled set out, and the band or cuff being resilient so as to be deformable inwardly of a tube axis thereof to facilitate insertion or removal of the flexible second tube from the first tube and with sufficient return bias to or towards a more relaxed condition such that the rib between a two rib engagement holds the first and second tubes against axial separation from each other, the band or cuff having two parallel annular ribs and the first tube having two parallel complementary grooves that each conform to a corresponding one of the annular ribs of the band or cuff and which connect via the rib of the first tube.

8. A flexible duct that removably fits with a tube having a ducting locus, comprising a cuff adapted to resiliently fit to a profiled region of the tube, the tube profiled region including in sequence toward a cuff-end thereof an inwardly directed annular channel set out from the ducting locus, an inwardly directed annular rib set out less than the set out of the channel, and an inwardly directed annular channel or set out rebate that is set out from the annular rib and is closest to an end of the tube to which the duct is fit, the cuff being configured to fit at least into said annular channel, over said annular rib, and into said annular channel or set out rebate, the duct being a second tube of an assembly as part of a particulate solids transport system, the assembly including an inter-engagement between a first tube and the second tube partly nested within the first tube, the second tube being a flexible tube with an end region annularly supported by a band or the cuff, the first tube having an end region thereof provided with an annularly profiled set out, each of the band or cuff and the annularly profiled set out having at least one annular rib directed to the annular rib of each other, and at least one of the band or cuff and the annularly profiled set out having two of the ribs so as to have the rib of the band or cuff and the annularly profiled set out engagingly flanked by the two ribs of the other of the band or cuff and the annularly profiled set out, and the band or cuff being resilient so as to be deformable inwardly of a tube axis thereof to facilitate insertion or removal of the flexible second tube from the first tube and with sufficient return bias to or towards a more relaxed condition such that the rib between a two rib engagement holds the first and second tubes against axial separation from each other, the band or cuff having two parallel annular ribs and the first tube having two parallel complementary grooves that each conform to a corresponding one of the annular ribs of the band or cuff and which connect via the rib of the first tube.

9. A plant having a discharge tube or port and a receiving tube or port for the ducted passage of a particulate material therebetween, comprising a flexible tube connecting the discharge tube or port to the receiving tube or port, and at least one tube-to-tube connection reliant on a resilient end region of the flexible tube having been deformed to allow an insertion thereof and then assumption of a secure relaxed condition of the resilient end region in the tube that encircles the end region of the flexible tube the plant including apparatus of an assembly as part of a particulate solids transport system, the assembly including an inter-engagement between a first tube and a second tube partly nested within the first tube, the second tube being a flexible tube with an end region annularly supported by a band or cuff, the first tube having an end region thereof provided with an annularly profiled set out, each of the band or cuff and the annularly profiled set out having at least one annular rib directed to the annular rib of each other, and at least one of the band or cuff and the annularly profiled set out having two of the ribs so as to have the rib of the band or cuff and the annularly profiled set out engagingly flanked by the two ribs of the other of the band or cuff and the annularly profiled set out, and the band or cuff being resilient so as to be deformable inwardly of a tube axis thereof to facilitate insertion or removal of the flexible second tube from the first tube and with sufficient return bias to or towards a more relaxed condition such that the rib between a two rib engagement holds the first and second tubes against axial separation from each other, the band or cuff having two parallel annular ribs and the first tube having two parallel complementary grooves that each conform to a corresponding one of the annular ribs of the band or cuff and which connect via the rib of the first tube.

10. A particulate materials transport system, comprising:

a flexible material ducting tube held with at least one of its end regions within a less flexible or rigid tube reliant on an annular profile into annular profile inter-engagement wherein there is one or both (a) resilient deformation of said end region to a non relaxed condition to allow its insertion to a more relaxed or fully relaxed held condition, and/or (b) notwithstanding the profile to profile inter-engagement, the surfaces of the connected tubes are otherwise flush, including an inter-engagement between a first tube and a second tube partly nested within the first tube, the second tube being a flexible tube with an end region annularly supported by a band or cuff, the first tube having an end region thereof provided with an annularly profiled set out, each of the band or cuff and the annularly profiled set out having at least one annular rib directed to the annular rib of each other, and at least one of the band or cuff and the annularly profiled set out having two of the ribs so as to have the rib of the band or cuff and the annularly profiled set out engagingly flanked by the two ribs of the other of the band or cuff and the annularly profiled set out, and the band or cuff being resilient so as to be deformable inwardly of a tube axis thereof to facilitate insertion or removal of the flexible second tube from the first tube and with sufficient return bias to or towards a more relaxed condition such that the rib between a two rib engagement holds the first and second tubes against axial separation from each other, the band or cuff having two parallel annular ribs and the first tube having two parallel complementary grooves that each conform to a corresponding one of the annular ribs of the band or cuff and which connect via the rib of the first tube.

11. An assembly as part of a particulate solids transport system, comprising an inter-engagement between a first tube and a second tube partly nested within the first tube, the second tube being a flexible tube with an end region annularly supported by a band or cuff, the first tube having an end region thereof provided with an annularly profiled set out, each of the band or cuff and the annularly profiled set out having at least one annular rib directed to the annular rib of each other, and at least one of the band or cuff and the annularly profiled set out having two of the ribs so as to have the rib of the band or cuff and the annularly profiled set out engagingly flanked by the two ribs of the other of the band or cuff and the annularly profiled set out, and the band or cuff being resilient so as to be deformable inwardly of a tube axis thereof to facilitate insertion or removal of the flexible second tube from the first tube and with sufficient return bias to or towards a more relaxed condition such that the rib between a two rib engagement holds the first and second tubes against axial separation from each other, the band or cuff having two parallel annular ribs and the first tube having two parallel complementary grooves that each conform to a corresponding one of the annular ribs of the band or cuff and which connect via the rib of the first tube.

12. The assembly of claim 11, wherein the band or cuff has a resilient cylindrical ring that underlies a profiled ring, the profiled ring providing the ribs of the band or cuff.

13. The assembly of claim 12, wherein the second tube includes a flexible sleeve with a fold back portion that encloses the profiled ring and the cylindrical ring.

* * * * *